No. 654,928. Patented July 31, 1900.
T. H. TAYLOR.
TRAP.
(Application filed Apr. 2, 1900.)
(No Model.)

WITNESSES:
INVENTOR
Thomas H. Taylor
BY
ATTORNEYS

UNITED STATES PATENT OFFICE.

THOMAS H. TAYLOR, OF LUZERNE, NEW YORK.

TRAP.

SPECIFICATION forming part of Letters Patent No. 654,928, dated July 31, 1900.

Application filed April 2, 1900. Serial No. 11,149. (No model.)

*To all whom it may concern:*

Be it known that I, THOMAS H. TAYLOR, a citizen of the United States, and a resident of Luzerne, in the county of Warren and State of New York, have invented a new and Improved Trap, of which the following is a full, clear, and exact description.

This invention relates to a trap for catching animals; and the object is to provide a device which will be sure to entrap the animals and to kill them instantly.

The device is especially adapted to be placed in a pathway or passage along which the animal is expected to move, in which case it will be quite impossible for the animal to avoid the trap.

This specification is the disclosure of one form of the invention, while the claims define the actual scope thereof.

Reference is to be had to the accompanying drawings, forming a part of this specification, in which similar characters of reference indicate corresponding parts in both views.

Figure 1:
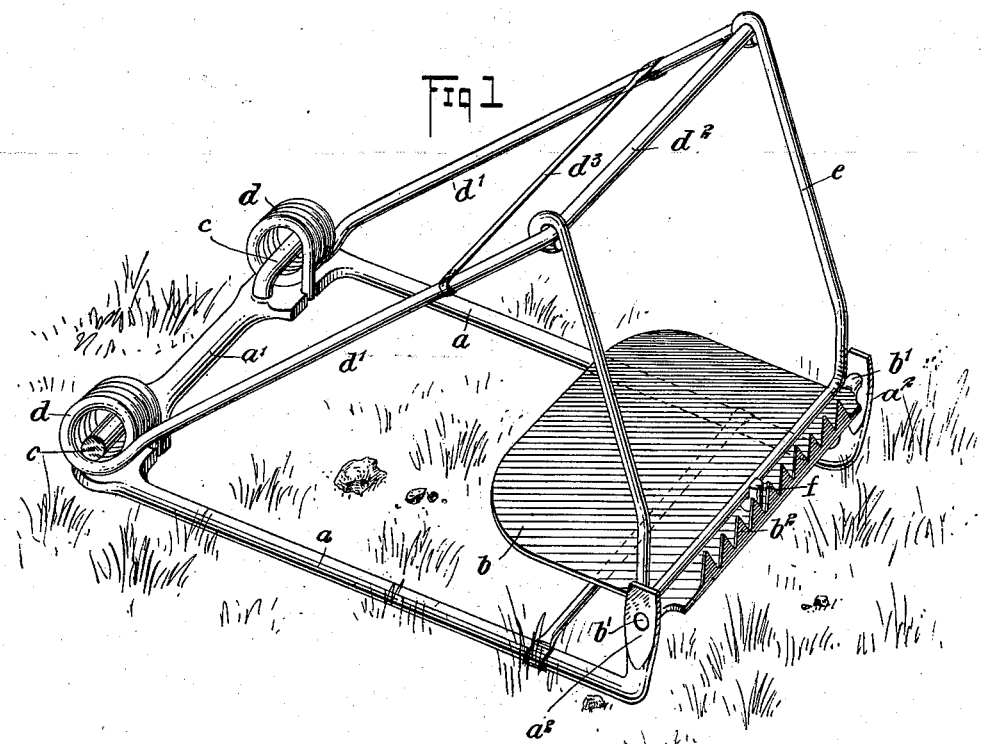
Figure 2:
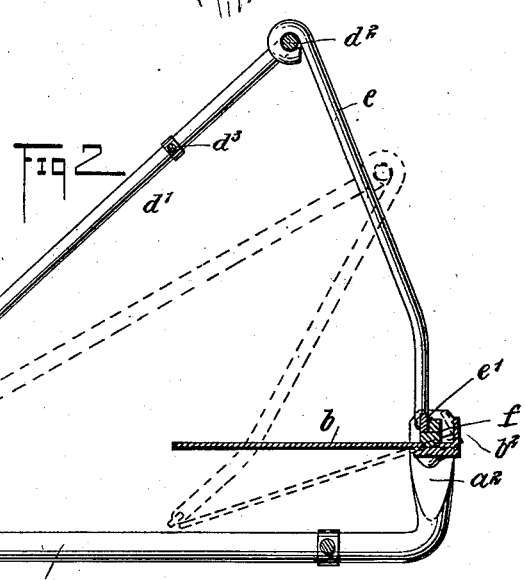

Figure 1 is a perspective view of the invention, and Fig. 2 is a sectional side view of the same.

The trap has a base which is formed of side bars $a$, joined rigidly to a rear end bar $a'$. The front ends $a^2$ of the side bars $a$ are turned upward to form bearings receiving the trunnions $b'$ of the trip-plate $b$, which is mounted by its trunnions to oscillate on the base of the trap. The front edge of the trip-plate $b$ is turned up and serves to form a jaw $b^2$, and the trip-plate extends rearwardly, as illustrated in the drawings, its rear portion being free to swing as will be necessary during the operation of the trap.

The rear end bar $a'$ has rigid arms $c$ attached to its ends, these arms extending upward and then being bent outward in opposite directions, so as to carry the coil-springs $d$, which are respectively arranged thereon and which have arms $d'$ extended therefrom, such arms being joined at their free ends by a cross-bar $d^2$, the parts $d'$ and $d^2$ forming a jaw member. The arms $d'$ may also be provided with an intermediate cross-bar $d^3$, which serves not only as a handpiece to facilitate the adjustment of the trap, but also as a means of striking and assisting in holding the animal. A U-shaped bail $e$ is pivotally mounted on the cross-bar $d^2$, the bottom member of the bail having a flattened portion $e'$, as shown in Fig. 2, and this flattened portion is designed to bear, when the trap is set, within a notch in a step-pin $f$, which is carried on the trip-plate $b$ in line with the trunnions $b'$ thereof. The full lines in the drawings show the position of the trap when set, in which case the arms $d'$ are raised up against the tension of the springs $d$ and the bail $e$ is sustained on the step-pin $f$ of the trip-plate, thus causing the trip-plate to assume the horizontal position shown, which is due to the fact that the step-pin $f$ is in line with the trunnions $b'$, and the strain on the springs $d$ on the trip-plate when the trap is set is evenly distributed on the trip-plate.

The trap may be baited or not, as desired, and the animal approaching the same upon disturbing the equilibrium of the trip-plate will cause the bail $e$ to move outward, as indicated by the dotted lines in Fig. 2, and then the arms $d'$ will be deprived of their support, and the springs $d$ will act to throw the arms down, causing the cross-bars $d^2$ and $d^3$ to throw up the trip-plate, with the cross-bar $d^2$ just outside of the jaw $b^2$. This will entrap the animal between the parts $b$ and $d^2$ and $d^3$ and cause the animal to be killed and securely held.

Having thus described my invention, I claim as new and desire to secure by Letters Patent—

1. A trap having a base, a jaw member mounted thereon, a spring pressing said jaw member to throw it against the base, a bail carried by the said jaw member, and a trip-plate pivotally mounted on the base and engaged by the bail to hold the trap open, movement of the trip-plate releasing the bail to close the trap, the trip-plate having its front edge turned to form a jaw working with the said jaw member, and the jaw member engaging the trip-plate when the trap is closed.

2. A trap having a base, a jaw member mounted thereon, a spring pressing the said jaw member to throw it toward the base, and a trip-plate pivotally mounted on the base and engaged by a part of the jaw member to hold the trap open, movement of the trip-plate releasing the jaw member to close the trap, and the trip-plate having a jaw formed thereon which works with the first-named jaw member.

In testimony whereof I have signed my name to this specification in the presence of two subscribing witnesses.

THOMAS H. TAYLOR.

Witnesses:
 THOMAS P. HALL,
 E. DAYTON.